T. R. DU BOIS.
STARTING AND LIGHTING SYSTEM.
APPLICATION FILED SEPT. 20, 1917.

1,363,237.  Patented Dec. 28, 1920.

WITNESS:
Fay E Bronk.
Ralph Munden

INVENTOR.
Thomas R. DuBois.
BY
Raymond H Van West
ATTORNEY.

UNITED STATES PATENT OFFICE.

THOMAS R. DU BOIS, OF ORANGE, NEW JERSEY, ASSIGNOR TO U. S. LIGHT & HEAT CORPORATION, OF NIAGARA FALLS, NEW YORK, A CORPORATION OF NEW YORK.

STARTING AND LIGHTING SYSTEM.

1,363,237.  Specification of Letters Patent.  Patented Dec. 28, 1920.

Application filed September 20, 1917. Serial No. 192,248.

*To all whom it may concern:*

Be it known that I, THOMAS R. DU BOIS, a citizen of the United States, residing at Orange, in the county of Essex and State of New Jersey, have invented new and useful Improvements in Starting and Lighting Systems, of which the following is a specification.

The present invention relates to starting and lighting systems.

More particularly the present invention relates to a novel arrangement of the circuits of the starting and lighting system whereby a strong field will be provided for the dynamo-electric machine which is adapted to charge the storage battery.

An object of the present invention is to provide a system in which the field winding of the dynamo-electric machine, which is used for charging the storage battery will be strongly energized when it is desired that said dynamo-electric machine shall perform generating functions.

A further object is to provide means in a system for the starting of an automobile engine in which the dynamo electric machine, which is used for charging the storage battery, will receive its energization from said storage battery in response to some act which is necessary in the starting operation.

A further object is to provide a starting and lighting system in which the field winding of the starting dynamo-electric machine will receive its energization from the storage battery, but in which waste of battery current will be prevented.

Further objects will be apparent as the description proceeds.

Referring to the drawings.

Figure 1:
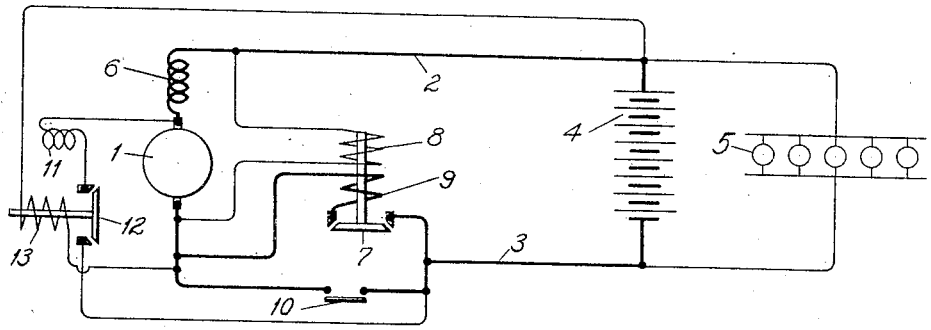
Figure 1 represents diagrammatically an embodiment of the present invention applied to a single unit starting and lighting system.

Referring first to Fig. 1, the numeral 1 represents the armature of the dynamo-electric machine which is adapted to be connected to an internal combustion engine (not shown) for starting same and which is also adapted to operate with a generating action for developing an E. M. F. for charging and lighting purposes.

The armature 1 is connected to the mains 2 and 3. Across these mains in parallel branches are connected a storage battery 4 and a lamp circuit 5. In one of the mains 2 and 3 is connected a series winding 6 which is adapted to supply excitation for armature 1. One of the mains 2 and 3 is provided with an automatic switch 7 which has the usual lifting coil 8 and holding coil 9. Bridging across the automatic switch 7 is the starting switch 10, whereby the storage battery 4 may be connected in circuit with the armature 1 and series field winding 6.

The armature 1 is also provided with a shunt field winding 11. Winding 11 is adapted to be connected across the mains 2, 3, under certain circumstances. As illustrated in Fig. 1, the connection of said field winding 11 across the mains is governed by an electro-magnetic switch 12. Said switch 12 is controlled by solenoid 13 which is connected across the terminals of armature 1, whereby, when the voltage across said armature is at or above a predetermined point, said solenoid 13 will close switch 12, thereby connecting the field winding 11 across the mains 2, 3, whereby to receive energization from the storage battery 4.

A mode of operation of the above described embodiment of the present invention is substantially as follows. When the operator desires to start the engine (not shown), he will close the starting switch 10 whereby circuit may be traced from the positive side of the storage battery, through the main 3, starting switch 10, armature 1, series field winding 6, back to the negative side of the battery. A certain amount of current will also pass from the main 3, through solenoid 13 to the negative side of the battery, whereby solenoid 13 will close the switch 12. The shunt field winding 11 will now be strongly energized from the storage battery 4 and as the armature speeds up, due to the starting of the internal combustion engine, said shunt field 11 will provide strong excitation, whereby the armature 1 will readily pick up to perform its generating function. Upon the acquirement of a predetermined voltage, the automatic switch 7 will be automatically closed and the armature 1 will deliver current to the storage battery and lamp circuit.

Figure 2:
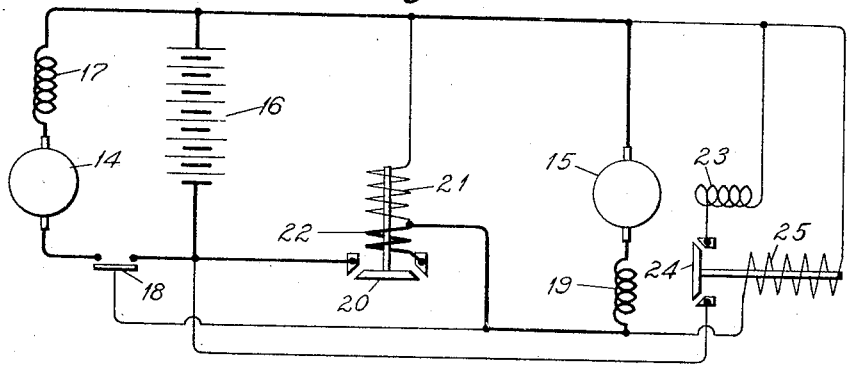
Fig. 2 illustrates a double unit system embodying the present invention, the generating unit being provided with reverse series winding regulation.

Fig. 2 illustrates the invention applied to a double unit starting and lighting system. In Fig. 2, two dynamo-electric machines are provided, having armatures 14 and 15. The dynamo-electric machine having the armature 14 has a motoring action, whereas the dynamo-electric machine provided with the armature 15 has a generating action. The storage battery 16 is adapted to be connected in circuit with both said armatures. The armature 14 has connected in series therewith a series field winding 17. Circuit may be completed from the storage battery through the series field winding 17 and motor armature 14, through a starting switch 18, back to the storage battery.

The armature 15 may be provided with a series field winding 19. Circuit to the storage battery 16 may be completed through armature 15 and series field winding 19 by means of the automatic switch 20, which is provided with the usual lifting coil 21 and holding coil 22. The armature 15 is provided with a shunt field winding 23 which is adapted to be connected across storage battery 16 under predetermined conditions. The circuit of said field winding 23 across the storage battery 16 is controlled by an electro-magnetic switch 24. Said switch 24 is responsive to the energization of a solenoid 25 which is adapted to be connected across the battery 16 when the starting switch 18 is in closed position.

It will be apparent from an inspection of Fig. 2 that when the operator closes the starting switch 18 with the purpose of starting the internal combustion engine (not shown), he will complete circuit from the positive side of the storage battery, through the starting switch 18, through solenoid 25, back to the negative side of the storage battery. Energization of the solenoid 25 will close switch 24, whereby the shunt field winding 23 of the generator armature 15 will be connected across said storage battery to receive energization therefrom. The generating armature 15 will therefore at once be operative to develop a considerable E. M. F., the automatic switch 20 will automatically close and the generator will be operative to deliver a charging current. The series field winding 19 of the generator armature will preferably be wound in such a manner that when the generator is delivering current, the flux due to said series winding 19 will oppose the flux due to the shunt field winding 23 to hold down the output of the generator to a predetermined value.

Figure 3:
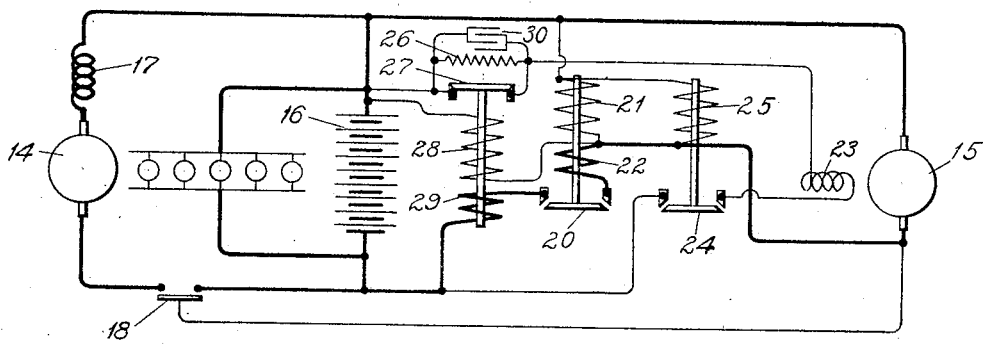
Fig. 3 illustrates a double unit system embodying the present invention in which the regulating means is of the vibrating regulator type.

The system disclosed in Fig. 3 also embodies a double unit starting and lighting system. Fig. 3 differs from Fig. 2 in the means for regulating the generating armature characteristics. In Fig. 3, the shunt field winding has in series therewith a resistance 26. This resistance is adapted to be short-circuited by the switch 27. Switch 27 may be electro-magnetically controlled. As illustrated, said switch is controlled by two coils, one of which, indicated as 28, is connected across the terminals of the generating armature 15, whereby it may be responsive to voltage conditions across said armature. The other coil, indicated as 29, may be connected in the main circuit of the generator armature 15 whereby it may be responsive to current changes. A condenser 30 may be connected across switch 27 to minimize sparking.

According to Fig. 3, if current developed by the generator, or the voltage developed across said generator should tend to rise above a predetermined value, said switch 27 will be operated with a vibratory motion in a manner well understood, to so vary the effect of the shunt field winding 23 as to keep these characteristics from rising above a predetermined value.

The switch 12 in Fig. 1 and the switch 24 in Figs. 2 and 3 have been illustrated as being responsive to the action of the starting switch. It will be obvious that they may be designed to be responsive to any other parts whose movement is necessitated in the starting action of the system. Various modifications may be made in the systems illustrated without departing from the invention. It is desired that all such modifications shall be covered in the patent, so long as they come within the scope of the invention as defined by the appended claim.

What I claim as new and desire to secure by Letters Patent of the United States, is:

In a starting and generating system, in combination, a motor, a generator, a storage battery, a switch for connecting said battery to said motor for starting functions, and an automatic switch for automatically connecting said battery to said machinery when said generator is developing a voltage equal to or greater than the counter E. M. F. of said battery, said generator being provided with a shunt field winding, said first mentioned switch being adapted to connect said shunt field winding across said battery for initial excitation, and a device responsive to a characteristic of said generator for varying the resistance of said shunt field circuit.

In witness whereof, I have hereunto subscribed my name.

THOMAS R. DU BOIS.